US007638191B2

(12) United States Patent
Tam et al.

(10) Patent No.: US 7,638,191 B2
(45) Date of Patent: Dec. 29, 2009

(54) HIGH TENACITY POLYETHYLENE YARN

(75) Inventors: Thomas Y-T. Tam, Richmond, VA (US);
Qiang Zhou, Chesterfield, VA (US);
John A. Young, Midlothian, VA (US);
Charles R. Arnett, Richmond, VA (US);
Conor Twomey, Dungarvan (IE)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/811,570

(22) Filed: Jun. 8, 2007

(65) Prior Publication Data
US 2008/0305331 A1 Dec. 11, 2008

(51) Int. Cl.
*D02G 3/00* (2006.01)
(52) U.S. Cl. ...................... 428/364; 428/394
(58) Field of Classification Search ............. 428/364, 428/394
See application file for complete search history.

(56) References Cited

U.S. PATENT DOCUMENTS

| 4,436,689 | A | | 3/1984 | Smith et al. ............. 264/204 |
| 4,551,296 | A | * | 11/1985 | Kavesh et al. ............ 264/203 |
| 4,663,101 | A | | 5/1987 | Kavesh et al. ............ 264/178 F |
| 4,668,717 | A | | 5/1987 | Lemstra et al. |
| 4,897,902 | A | * | 2/1990 | Kavesh et al. ............ 28/166 |
| 5,547,626 | A | | 8/1996 | Ohta et al. .............. 264/203 |
| 5,578,374 | A | * | 11/1996 | Dunbar et al. ............ 428/364 |
| 5,736,244 | A | * | 4/1998 | Kavesh et al. ............ 428/364 |
| 6,448,359 | B1 | * | 9/2002 | Kavesh ................... 526/352 |
| 6,448,659 | B1 | | 9/2002 | Kavesh ................... 526/352 |
| 6,969,553 | B1 | | 11/2005 | Martin et al. ............. 424/728 |
| 2005/0093200 | A1 | | 5/2005 | Tam et al. .............. 264/211.14 |
| 2008/0085982 | A1 | * | 4/2008 | Smith et al. ............. 526/352 |
| 2008/0305331 | A1 | * | 12/2008 | Tam et al. .............. 428/374 |

FOREIGN PATENT DOCUMENTS

WO 2005/066401 A1 7/2005

OTHER PUBLICATIONS

D.C. Prevorsek, "SPECTRA: The Latest entry in the Field of High Performance Fibers", Handbook of Fiber Science and Technology vol. 3, 48-59, Marcel Dekker, NY, 1996.
Y. Tremonia et al., "Theoretical Study of the Influence of the Molecular Weight on the Maximum Tensile Strength of Poymer Fibers.," *Macromolecules*, 18, 2246-2252 (1985).
P. Smith et al., "Tensile Strength of Highly Oriented Polyethyelene. II. Effect of Molecular Weight Distribution", J. *Poly.Sci., Poly.Phys. Ed.*, 20, 2229-2241 (1982).
G. R. Rideal et al., "The Thermal-Mechanical Degradation of High Density Polyethylene", *J. Poly. Sci. Sci. Symposium*, 37, 1-15 (1976).
N. Dontula, "A Study of Degradation of High Density Polyethylene in a Corotating Intermeshing Twin Screw Extruder", *J. Poly. Eng. & Sci.*, 33 No. 5, 271-278 (1993).

* cited by examiner

*Primary Examiner*—N. Edwards
(74) *Attorney, Agent, or Firm*—Erika S. Wilson

(57) ABSTRACT

A process for preparing ultra-high molecular weight polyethylene (UHMWPE) multi-filament yarns having improved tensile properties and the yarns and articles thereby produced.

4 Claims, 6 Drawing Sheets

HIGH TENACITY POLYETHYLENE YARN

BACKGROUND OF THE INVENTION

1. Field of the Invention

This invention relates to a process for preparing ultra-high molecular weight polyethylene (UHMWPE) multi-filament yarns having improved tensile properties and the yarns and articles thereby produced.

2. Description of the Related Art

UHMWPE multi-filament yarns have been produced possessing high tensile properties such as tenacity, tensile modulus and energy-to-break. The yarns are useful in applications requiring impact absorption and ballistic resistance such as body armor, helmets, breast plates, helicopter seats, spall shields; composite sports equipment such as kayaks, canoes bicycles and boats; and in fishing line, sails, ropes, sutures and fabrics.

Multi-filament "gel spun" ultra-high molecular weight polyethylene (UHMWPE) yarns are produced by Honeywell International Inc. DSM N.V. Toyobo Co. Ltd. and Tongyizhong Specialty Fibre Technology and Development Co., Ltd. The gel-spinning process discourages the formation of folded chain molecular structures and favors formation of extended chain structures that more efficiently transmit tensile loads.

The first description of the preparation and drawing of single UHMWPE filaments in the gel state was by P. Smith, P. J. Lemstra, B. Kalb and A. J. Pennings, *Poly. Bull.*, 1, 731 (1979). Single filaments of UHMWPE were spun from solution and drawn while evaporating the solvent. More recent processes (see, e.g., U.S. Pat. Nos. 4,551,296, 4,663,101, 6,448,659 and 6,969,553 describe drawing all three of the solution filaments, gel filaments and the solvent-free filaments. The disclosures of U.S. Pat. Nos. 4,551,296, 4,663, 101, 5,741,451, 6,448,659, and 6,969,553 and United States Application 20050093200 are hereby incorporated by reference to the extent not incompatible herewith.

The theoretical strength of a polyethylene molecule is directly related to its molecular weight. (D. C. Prevorsek, Handbook of Fiber Science and Technology, Vol. 3, Section 3.2, P. 48-59, Marcel Dekker. Inc., New York 1996. Y. Tremonia et al. *Macromolecules*, 18, 2246 (1985)). The experimentally realizable strength of a polyethylene fiber was found to be directly related to the molecular weight of the polyethylene from which the fiber is spun, and also related to the breadth of the molecular weight distribution of that starting polymer (P. Smith et al., *J. Poly. Sci., Poly. Phys. Ed.*, 20 2229 (1982)). Higher fiber strength was favored by spinning polymers having weight average molecular weight to number average molecular weight ratios ($M_w/M_n$) less than seven. However, it appeared that the variation of $M_w/M_n$ from 7 to 15.6 did not affect tensile strength.

U.S. Pat. No. 4,436,659 taught the spinning of UHMWPE having $M_w/M_n$ lower than 5, the polymer having been obtained by fractionation of a polymer having a broader molecular weight distribution or by polymerization using specific catalyst systems and/or specific reaction conditions.

U.S. Pat. No. 5,547,626 taught intentional degradation of intrinsic viscosity (IV), polymer to fiber, to a final IV from 10% to 30% lower than the initial polymer IV. The upper bound on degradation was said to be necessary because an excessive decrease in the average molecular weight would cause a decrease in the fiber tenacity. The patent taught spinning of polyethylene solutions under oxidizing conditions, e.g., no use of antioxidant in the spinning solution and cooling of the extruded fibers in air. Among important process factors not specified in U.S. Pat. No. 5,547,626 were the extrudate temperature, the residence time in the single screw extruder, the intrinsic viscosity of the polymer in the extrudate, and the screw diameter, rotational speed and screw configuration.

A study by G. R. Rideal et al., titled "The Thermal-Mechanical Degradation of High Density Polyethylene", *J. Poly. Sci., Symposium*, No 37, 1-15 (1976) found that the presence of oxygen promoted shear induced chain scission, but that under nitrogen at temperatures less than 290° C., long chain branching and viscosity increase dominated.

A study by N. Dontula et al., titled "A Study of Degradation of High Density Polyethylene in a Corotating Intermeshing Twin Screw Extruder". *Poly. Eng. & Sci.*, 33 No, 5, 271-278 (1993) found similarly complex relationships between processing conditions and viscosity. Interaction between extruder temperature, screw speed and residence time caused directional changes in effects on viscosity.

Each of these references represented an advance in the state of the art, however none suggested the process or fibers of this invention, and none satisfied all of the needs met by this invention. In the process of the invention, it is believed that thermal-mechanical chain scission is as active as oxidative chain scission. The result is fibers with higher strength at lower intrinsic viscosity (lower molecular weight) than has previously been obtainable and composites with improved ballistic protection properties. A need has long existed for a multi-filament high strength polyethylene yarn having this combination of properties and a process for its production.

SUMMARY OF THE INVENTION

In one embodiment, the invention is a process of producing a high strength polyethylene multi-filament yarn comprising the steps of:

a) forming a slurry of an ultrahigh molecular weight polyethylene (UHMWPE) having an initial intrinsic viscosity ($IV_0$) at least about 10 dl/g and an antioxidant in a solvent for said UHMWPE having an atmospheric pressure boiling point at least about 180° C. at a temperature that is below the temperature at which the UHMWPE will dissolve in said solvent, the weight ratio of said UHMWPE to said solvent being from about 5:95 to about 95:5 and the weight ratio of said antioxidant to said solvent being from about 10 parts per million to about 1000 parts per million;

b) feeding said slurry to an intermeshing co-rotating twin screw extruder wherein the screws in said twin screw extruder are comprised of multiple segments having a root diameter of $D_r$ millimeters, an outside diameter of $D_o$ millimeters, the ratio $D_r/D_o$ is R, the rotational speed of the screws is ω revolutions per minute and following relationships are satisfied $$0.84 \geq R \geq 0.55$$

$$\omega D_0 \left( \frac{(1+R)}{(1-R)} \right) \geq 70,000, \text{ millimeters/min}$$

c) forming a liquid mixture in said extruder of said UHMWPE and said antioxidant, in said solvent at a temperature from about 140° C. to about 320° C., the intrinsic viscosity of the UHMWPE in said mixture being reduced to a value of from about $0.2\,IV_0$ to about $0.7\,IV_0$ in passing through said extruder;

d) passing said liquid mixture through a heated vessel at a temperature at least about 140° C., said vessel having a volume such that the average residence time in said vessel is from about: 2 to about 120 minutes, whereby a solution of the UHMWPE is formed:

e) passing the thus-formed solution through a spinneret to form solution filaments;

f) passing said solution filaments through a short gaseous space into a liquid quench bath at a temperature less than 35° C. wherein said solution filaments are rapidly cooled to form gel filaments;

g) removing the solvent from the gel filaments to form solid filaments, and h) stretching at least one of the solution filaments, the gel filaments and the solid filaments in one or more stages to a combined stretch ratio of at least 10:1, wherein a stretch of at least 2:1 is applied to the solid filaments to form a high strength multifilament UHMWPE yarn, said UHMWPE yarn having a tenacity at least 40 g/d, and having an intrinsic viscosity from 0.2 $IV_0$ to 0.65 $IV_0$.

In another embodiment, the invention is a high strength UHMWPE multi-filament yarn comprising at least about 100 filaments having a tenacity at least about 40 g/d and an intrinsic viscosity less than or equal to 16 dl/g.

In yet another embodiment, the invention is a high strength UHMWPE multi-filament yarn comprising at least about 100 filaments having a tenacity at least about 45 g/d and an intrinsic viscosity less than or equal to about 16 dl/g.

The invention also includes articles comprising the inventive yarns.

BRIEF DESCRIPTION OF THE DRAWINGS

FIGS. 2-5 show infra-red absorbance ratios of the inventive fiber in comparison to four prior art UHMWPE fibers.

DETAILED DESCRIPTION OF THE INVENTION

As used herein throughout, It will be understood that Intrinsic viscosities (IV's) are measured in decalin at 135° C. The relationship between weight average molecular weight ($\overline{M}_w$) and IV recommended by the Polymer Handbook, Second Ed., J. Brandrup and E. H. Immergut, Ed., John Wiley and Sons, New York, 1975, P. IV-7 will be assumed:

IV, deciliters/g (dl/g)=$0.00062\overline{M}_w^{0.7}$

For purposes of the invention, a fiber is an elongate body the length dimension of which is much greater than the transverse dimensions of width and thickness. Accordingly, the term fiber includes filament, ribbon, strip and the like having regular or irregular cross-section. A yarn is a continuous strand comprised of many fibers or filaments.

In a first embodiment, the invention is a process of producing a high strength polyethylene multi-filament yarn comprising the steps of:

a) forming a slurry of an ultrahigh molecular weight polyethylene (UHMWPE) having an initial intrinsic viscosity ($IV_0$) at least about 10 dl/g and an antioxidant in a solvent for said UHMWPE having an atmospheric pressure boiling point at least about 180° C. at a temperature that is below the temperature at which the UHMWPE will dissolve in said solvent, the weight ratio of said UHMWPE to said solvent being from about 5:95 to about 95:5 and the weight ratio of said antioxidant to said solvent being from about 10 parts per million to about 1000 parts per million:

b) feeding said slurry to an intermeshing co-rotating twin screw extruder wherein the screws in said twin screw extruder are comprised of multiple segments having a root diameter of $D_r$ millimeters: an outside diameter of $D_o$ millimeters, the ratio $D_r/D_o$ is R, the rotational speed of the screws is $\omega$ revolutions per minute and following relationships are satisfied $$0.84 \geq R \geq 0.55$$

$$\omega D_0 \left( \frac{(1+R)}{(1-R)} \right) \geq 70{,}000, \text{ millimeters/min}$$

c) forming a liquid mixture in said extruder of said UHMWPE and said antioxidant, in said solvent at a temperature from 140° C. to 300° C., the intrinsic viscosity of the UHMWPE in said mixture being reduced to a value of from about 0.2 $IV_0$ to about 0.7 $IV_0$ in passing through said extruder;

d) passing said liquid mixture through a heated vessel at a temperature at least about 140° C. said vessel having a volume such that the average residence time in said vessel is from about 2 to about 120 minutes, whereby a solution of the UHMWPE is formed.

e) passing the thus-formed solution through a spinneret to form solution filaments;

f) passing said solution filaments through a short gaseous space into a liquid quench bath at a temperature less than about 35° C. wherein said solution filaments are rapidly cooled to form gel filaments;

g) removing the solvent from the gel filaments to form solid filaments; and h) stretching at least one of the solution filaments, the gel filaments and the solid filaments in one or more stages to a combined stretch ratio of at least about 10:1, wherein a stretch of at least about 2:1 is applied to the solid filaments to form a high strength multi-filament UHMWPE yarn, said UHMWPE yarn having a tenacity at least about 40 g/d, and having an intrinsic viscosity from 0.2 $IV_0$ to 0.65 $IV_0$.

The UHMWPE to be processed has an IV at least about 10, preferably at least about 15 dl/g, more preferably at least about 20 dl/g, yet more preferably at least about 25 dl/g and most preferably at least about 30 dl/g.

Preferably, the UHMWPE has fewer than about 5 side groups per 1000 carbon atoms, more preferably fewer than about 2 side groups per 1000 carbon atoms, yet more preferably fewer than about 1 side group per 1000 carbon atoms, and most preferably fewer than about 0.5 side group per 1000 carbon atoms. Side groups may include but are not limited to C1-C10 alkyl groups, vinyl terminated alkyl groups, norbornene, halogen atoms, carbonyl, hydroxyl, epoxide and carboxyl. The UHMWPE may contain small amounts, generally less than about 5 wt. %, preferably less than about 3 wt. % of additives such as anti-oxidants, thermal stabilizers, colorants, flow promoters, solvents, etc.

The solvent is preferably selected from the group consisting of hydrocarbons such as aliphatics, cyclo-aliphatics, and aromatics, halogenated hydrocarbons such as dichlorobenzene, and mixtures thereof. The solvent has an atmospheric pressure boiling point at least about 180° C. Preferably, the solvent is selected from the group consisting of cis-decahydronaphthalene, trans-decahydronaphthalene, decalin, mineral oil and their mixtures.

Preferably, the anti-oxidant is selected from the group consisting of hindered phenols, aromatic phosphites, amines and their mixture. More preferably, the anti-oxidant is selected from the group consisting of (2,6-di-tert-butyl-4-methyl-phenol, tetrakis[methylene(3,5-di-tert-butylhydroxyhydrocinnamate)]methane, tris(2,4-di-tert-butylphenyl)phosphite, octadecyl 3,5-di-tert-butyl-4-hyroxyhydrocinnamate, 1,3,5-tris(3,5-di-tert-butyl-4-hydroxybenzyl)-1,3,5-triazine-2,4,6 (1H,3H,5H)-trione, 2,5,7,8 tetramethyl-2(4',8',12'-trimethyl-tridecyl)chroman-6-ol and their mixtures. More preferably the anti-oxidant is 2,5,7,8 tetramethyl-2(4',8',12'-trimethyl-tridecyl)chroman-6-ol commonly known as Vitamin E or α-tocopherol.

The concentration of the antioxidant should be sufficient to minimize the effects of adventitious oxygen but not so high as to react with the polymer. The weight ratio of the antioxidant to the solvent is from about 10 parts per million to about 1000 parts per million. Preferably, the weight ratio of the antioxidant to the solvent is from about 10 parts per million to about 100 parts per million.

A slurry is formed of the UHMWPE and the anti-oxidant in the solvent, the weight ratio of the UHMWPE to the solvent being from about 5:95 to about 95:5. Preferably, the weight ratio of UHMWPE to solvent is from about 6:94 to about 50:50, and more preferably from about 8:92 to about 30:70.

The intermeshing co-rotating twin screw extruder employed in the inventive process has two functions: first the transformation of the polymer slurry into an intimate liquid mixture of molten polymer and solvent, ideally with domain sizes of microscopic dimensions. Second, the extruder provides an environment where it is believed that thermo-mechanical chain scission of the molten polyethylene occurs in preference to oxidative chain scission.

It has been found that the quantities R and $$\omega D_0 \left( \frac{(1+R)}{(1-R)} \right)$$

are important in selecting an intermeshing co-rotating twin screw extruder and its operating speed, where $D_r$ is the root diameter of the screw measured in millimeters, $D_o$ is the outside diameter of the extruder screw measured in millimeters, R is the ratio $D_r/D_o$ and the rotational speed of the screws is $\omega$ revolutions per minute. R is from 0.55 to 0.84 and the quantity $$\omega D_0 \left( \frac{(1+R)}{(1-R)} \right)$$

is equal to or greater than 70,000 millimeters/min and. Preferably, R is from 0.65 to 0.82 and $$\omega D_0 \left( \frac{(1+R)}{(1-R)} \right)$$

is equal to or greater than 90,000 millimeters/min. Most preferably, $$\omega D_0 \left( \frac{(1+R)}{(1-R)} \right)$$

is equal to or greater than 110,000 millimeters/min.

A liquid mixture of molten polyethylene and solvent is formed in the extruder at a temperature from about 140° C. to about 320° C. Preferably, a liquid mixture is formed in the extruder at a temperature from about 220° C. to about 320° C. More preferably, a liquid mixture is formed in the extruder at a temperature from about 220° C. to about 280° C.

Preferably, the twin screw extruder is run liquid full with the extruder feed zone flooded with the slurry feed under an inert gas blanket.

A practical process for the production of UHMWPE fibers requires efficient use of high capital cost equipment such as a twin screw extruder. Volumetric throughput through the extruder is inversely proportional to the residence time in the extruder. The average residence time in the extruder, defined as the ratio of free volume in the extruder to the volumetric throughput rate, is less or equal to about 1.5 minutes, preferably less than or equal to about 1.2 minutes and more preferably, less than or equal to about 1.0 minutes. Preferably, substantially all of the screws segments in the twin screw extruder are forwarding conveying flight segments. More preferably, there are no back-mixing or kneading segments.

In the process of the invention, the intrinsic viscosity of the polyethylene in the liquid mixture is reduced in passing through the twin screw extruder by from 30% to 80%, i.e., from an initial intrinsic viscosity of $IV_0$ to from about 0.2 $IV_0$ to about 0.7 $IV_0$.

The liquid mixture leaving the extruder is passed by means of a melt pump through a heated vessel at a temperature at least about 140° C. providing sufficient residence time whereby a solution of the UHMVVPE is formed. Preferably, the heated vessel is at a temperature of from about 220° C. to about 320° C. More preferably, the heated vessel is at a temperature of from about 220° C. to about 280° C.

The heated vessel has a volume such that the average residence time in the vessel is from about 2 to about 120 minutes. Preferably, the heated vessel has a volume such that the residence time in the vessel is from about 6 to about 60 minutes.

The solution of the UHMWPE is passed through a spinneret to form multiple solution filaments constituting a solution yarn. Preferably, the spinneret forms a solution yarn of at least about 100 filaments, more preferably, at least about 200 filaments, yet more preferably, at least about 400 filaments and most preferably, at least about 800 filaments.

The solution yarn is passed through a short gaseous space into a liquid quench bath wherein it is thermally quenched into a gel yarn. The gaseous space preferably has a dimension of from about 0.3 to about 10 centimeters, more preferably from about 0.4 to about 5 centimeters. The gaseous space may be filled with inert gas such as nitrogen. If the residence time of the solution yarn in the gaseous space is less than about 1 second, the gaseous space may be filled with air.

The liquid in the quench bath is preferably selected from the group consisting of water, ethylene glycol, ethanol, isopropanol, a water soluble anti-freeze and their mixtures. Preferably, the liquid quench bath temperature is from about −35° C. to about 35° C.

Solvent is removed from the gel yarn to form solid filaments. The solvent is preferably removed from the gel yarn by evaporation or by extraction with a lower boiling solvent followed by evaporation. Preferably, the solvents are recovered and recycled.

Stretching is performed on at least one of the solution filaments, the gel filaments and the solid filaments in one or more stages to a combined stretch ratio of at least about 10:1, wherein a stretch of at least about 2:1 is applied to the solid filaments to form a high strength multi-filament UHMWPE yarn. Preferably, stretching is performed on all three of the solution filaments, the gel filaments and the solid filaments.

The UHMWPE yarn produced by the process of the invention preferably has an intrinsic viscosity less than or equal to about 18 dl/g.

In another embodiment, the invention is an UHMWPE high strength multi-filament yarn comprising at least 100 filaments having a tenacity at least 40 g/d and an intrinsic viscosity less than or equal to about 16 dl/g. Preferably, the high strength multi-filament yarn has an intrinsic viscosity less than or equal to about 14 dl/g, more preferably less than or equal to about 12 dl/g.

In yet another embodiment, the invention is an UHMWPE high strength multi-filament yarn comprising at least 100 filaments having a tenacity at least about 45 g/d and an intrinsic viscosity less than or equal to about 16 dl/g. Preferably, the high strength multi-filament yarn has an intrinsic viscosity less than or equal to about 14 dl/g, more preferably less than or equal to about 12 dl/g.

Ratio of Average Molecular Weights

It is extremely difficult to accurately determine number average molecular weights for UHMWPE's having IV's of 10 dl/g and above. However, weight average and Z average molecular weights can be determined by a combination of viscosity and light scattering methods. Number average, weight average and Z average molecular weights are defined by the following relationships:

$$\overline{M}_n = \frac{\sum_i N_i M_i}{\sum_i N_i}$$

$$\overline{M}_w = \frac{\sum_i N_i M_i^2}{\sum_i N_i M_i} \text{ or } \overline{M}_n = \frac{\sum_i M_i c_i}{\sum_i c_i}$$

$$\overline{M}_z = \frac{\sum_i N_i M_i^3}{\sum_i N_i M_i^2} \text{ or } \overline{M}_z = \frac{\sum_i M_i^2 c_i}{\sum_i M_i c_i}$$

where $M_i$ is the molecular weight of the ith molecular species, $N_i$ is the number of molecules having molecular weight $M_i$ and concentration $c_i$ is proportional to $N_i M_i$.

It will be seen that in the progression from number average, to weight average, and to Z average, the largest molecules are weighted more and more heavily. Thus, differences in the ratios of Z average to weight average molecular weights for different materials are indicative of differences in the populations of the largest molecules.

Ratios of Z average to weight average molecular weight were determined from simultaneous light scattering and solution viscosity measurements. The polyethylene fibers to be characterized were dissolved in trichlorobenzene at about 0.05 wt. % concentration at 170° C. The solution was analyzed by gel permeation chromatography on a bank of three PLGel 20-μm Mixed A columns in a Waters 2000 GPCV system having a built-in viscosity detector and a Precision Detector 2040 light scattering detector set at 9.80 from the incident beam. The molecular weight distribution was found from $$M \propto \sqrt{\frac{\Delta I * \Delta H}{V}} \text{ and } c \propto \sqrt{\frac{V * \Delta I}{\Delta H}}$$

where V is the volume determined by universal calibration and $\Delta I$ and $\Delta H$ are the signal strength above baseline for the light scattering and viscosity detectors. The ratio of Z average to weight average molecular weight $\overline{M}_z/\overline{M}_w$ was calculated from the molecular weight distribution.

Preferably, an UHMWPE of the invention has a ratio of Z average molecular weight to weight average molecular weight ($\overline{M}_z/\overline{M}_w$) less than or equal to about 3.5, and more preferably, from about 2.0 to about 3.5.

Infra-Red Absorbance

Infra-red absorbances were measured using a Nicolet Magna-IR 560 spectrometer with the resolution set to 0.964 cm$^{-1}$. Data were taken at 0.964 cm$^{-1}$ intervals between 4000 and 400 cm$^{-1}$. The absorbances at wave numbers of 1720 cm$^{-1}$, 910 cm$^{-1}$, 965 cm$^{-1}$, and 890 cm$^{-1}$ corresponding respectively to carbonyl, vinyl, transvinylene and vinylidene moieties were measured relative to the absorbance at 2017 cm$^{-1}$ corresponding to the —CH$_2$— stretching mode of polyethylene.

An UHMWPE yarn of the invention preferably has infra-red absorbance ratios satisfying at least two of the following relationships:

$$0.84 \geq A_{1720}/A_{2017} \geq 0.77$$

$$0.77 \geq A_{910}/A_{2017} \geq 0.71$$

$$0.77 \geq A_{965}/A_{2017} \geq 0.71$$

$$0.77 \geq A_{890}/A_{2017} \geq 0.70$$

$$0.77 \geq A_{910}/A_{2017} \geq 0.71$$

where $A_x$ is the infra-red absorbance at x cm$^{-1}$.

More preferably, an UHMWPE yarn of the invention has infra-red absorbance ratios satisfying the following relationships:

$$0.84 \geq A_{1720}/A_{2017} \geq 0.77$$

$$0.77 \geq A_{910}/A_{2017} \geq 0.71$$

where $A_x$ is the infra-red absorbance at x cm$^{-1}$ $0.77 \geq A_{910}/A_{2017} \geq 0.71$ Preferably, an UHMWPE yarn of the invention has an infra-red absorbance ratio $A_{1720}/A_{910}$ less than or equal to 1.07.

The invention also includes articles comprising the inventive yarns.

EXAMPLES

Example 1

An UHMWPE produced using a Ziegler/Natta catalyst system was selected having an intrinsic viscosity of 21 dl/g. The UHMWPE had fewer than 0.5 methyls/1000 carbon atoms and a melting point of 138° C. A solvent was selected consisting of white mineral oil. The white mineral oil was HYDROBRITE® 550 PO, a low volatility oil from Crompton Corporation consisting of about 70% paraffinic carbon and about 30% of naphthenic carbon. An anti-oxidant consisting of 25 parts per million of (α-tocopherol was added to the mineral oil.

A slurry consisting of 8 parts by weight of UHMWPE in 92 parts by weight of mineral oil was prepared in an agitated mix tank at 35-38° C. The slurry was continuously fed at the rate of 112.5 lbs/hr into the feed hopper of an intermeshing co-rotating twin screw extruder. The feed hopper and slurry feed were maintained under a nitrogen blanket. The feed hopper was maintained in a flooded condition keeping the extruder barrel liquid full. The screws of the extruder had an outside diameter $D_0$ of 40 mm. The screw elements were all forwarding conveying elements having a root diameter $D_r$ of 32.52 mm. The screw rotational speed was 250 RPM. R, the ratio $D_r/D_o$, was 0.813 The quantity $$\omega D_0 \left( \frac{(1+R)}{(1-R)} \right)$$

was equal to 96,956 millimeters/min.

The free volume in this extruder (barrel volume minus screw volume) was 1400 cm$^3$. The extruder barrel temperature was 260° C. The UHMWPE/mineral oil slurry was converted to a liquid mixture at 260° C. in passing through the extruder with an average residence time of 1.15 minutes. The liquid mixture leaving the extruder passed through a gear pump and thence into a vessel.

A side-stream sample was taken of the liquid mixture leaving the extruder for off-line analysis. The intrinsic viscosity of the UHMWPE in the sample was found to be 12.6 dl/g. The IV of the UHMWPE had been reduced to a value 60% of the initial IV in passing through the extruder.

The liquid mixture exiting the extruder and a gear pump passed, through a vessel consisting of an externally heated pipe at a temperature of 282° C., a length of 46.5 feet (14.17 meters), an internal volume of 29.212 cm$^3$ and several bends and changes in diameter. At intervals within the vessel there were static mixers. The liquid mixture was converted to a solution in passing through the vessel with an average residence time of 24 minutes.

The UHMWPE solution leaving the vessel was passed through a gear pump and thence through a spin block and a spinneret having holes of 0.036 in. (0.914 mm) diameter to form a solution yarn of 181 filaments. The solution yarn was stretched 1.8:1 in passing through a 3 cm air gap to a water bath at 9.5° C. where it was quenched to a gel yarn. The gel yarn was stretched at a first draw ratio of 4.6:1 at room temperature, passed counter-current to a stream of cyclohexane to extract the mineral oil, and through a dryer to substantially evaporate the cyclohexane. The gel yarn was additionally stretched at a draw ratio of 2.1:1 during extraction and drying. The essentially dry yarn containing less than about 10 wt. % of solvents was stretched in two stages at a temperature of 142° C. to a draw ratio of 1.32:1 to form a partially oriented yarn (POY). The final in-line draw was at a ratio less than 1.1:1.

The POY had a tenacity of about 18 g/d (about 16 g/dtex), and an elongation at break of about 8%. The POY was wound up at the rate of 0.376 g/min per filament without twist. The above process was continuous and unbroken from solution formation to winding of the POY.

The POY was transferred to an off-line stretching apparatus where it was stretched at a draw ratio of 4.2:1 at a temperature of 150° C. to form a highly oriented yarn (HOY) of the invention. The HOY was cooled under tension and wound up. It had a denier of 679, a tenacity of 44.9 g/d (40.1 g/dtex), a tensile modulus of 1391 g/d (1252 g/dtex), and an elongation at break of 3.4%. The yarn of the invention had an intrinsic viscosity of 11.7 dl/g. The yarn IV was 56% of the IV of the UHMWPE from which it was spun. In relation to intrinsic viscosity ($IV_0$) of the UHMWPE from which the inventive yarn was spun, the HOY had an IV of 0.44 $IV_0$.

Figure 1:
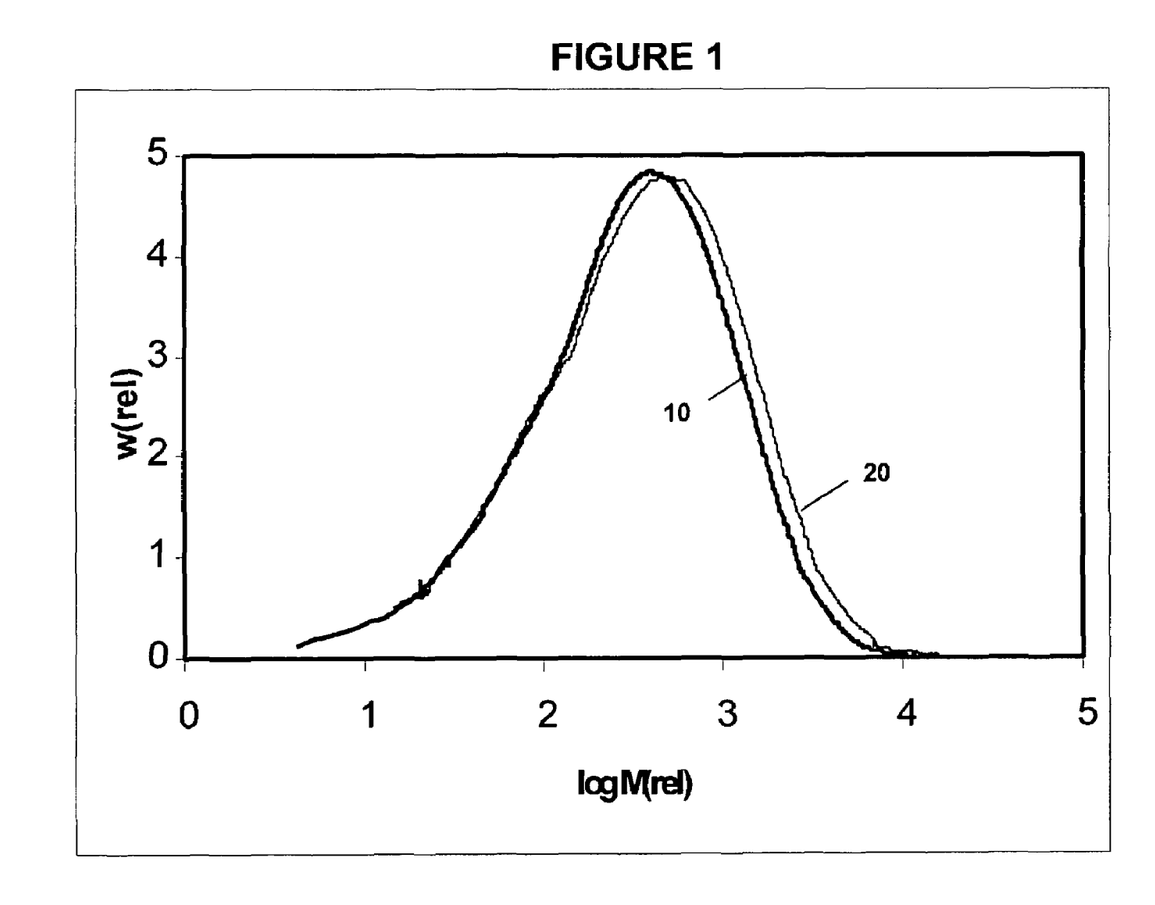
FIG. 1 is a plot of relative concentration versus log of relative molecular weight for a fiber of the invention and a prior art fiber.

The ratios of Z average to weight average molecular weight of this inventive yarn and of an UHMWPE yarn prepared from the same starting polymer by a prior art process were determined by simultaneous solution viscosity and light scattering measurements as described above. FIG. 1 is a plot of relative concentration versus log of relative molecular weight for this yarn of the invention, 10 and the prior art UHMWPE yarn, 20. The ratio $\overline{M}_z/\overline{M}_n$ was 3.0 for the yarn of the invention and 3.6 for the prior art yarn. It is seen that in comparison to the prior art yarn, the inventive yarn had a lower proportion of the higher molecular weight fractions.

Example 2

An UHMWPE produced using a Ziegler/Natta catalyst system was selected having an intrinsic viscosity of 33 dl/g. The solvent, and anti-oxidant were the same as in Example 1 as were all process conditions up to the end of the production of the POY. The IV of the UHMWPE in the liquid mixture leaving the extruder was 15.8 dl/g. The IV of the UHMWPE had been reduced to a value 48% of the initial IV in passing through the extruder.

The POY was transferred to an off-line stretching apparatus where it was stretched at a draw ratio of 6.3:1 at a temperature of 150° C. to form a highly oriented yarn (HOY) of the invention. The HOY was cooled under tension and wound up. It had a denier of 460, a tenacity of 49.3 g/d (44.4 g/dtex), a tensile modulus of 1632 g/d (1468 g/dtex), and an elongation at break of 3.3%. The yarn of the invention had an intrinsic viscosity of 15.1 dl/g. The IV of the yarn of the invention was 46% of the IV of the UHMWPE from which it was spun.

Figure 2:
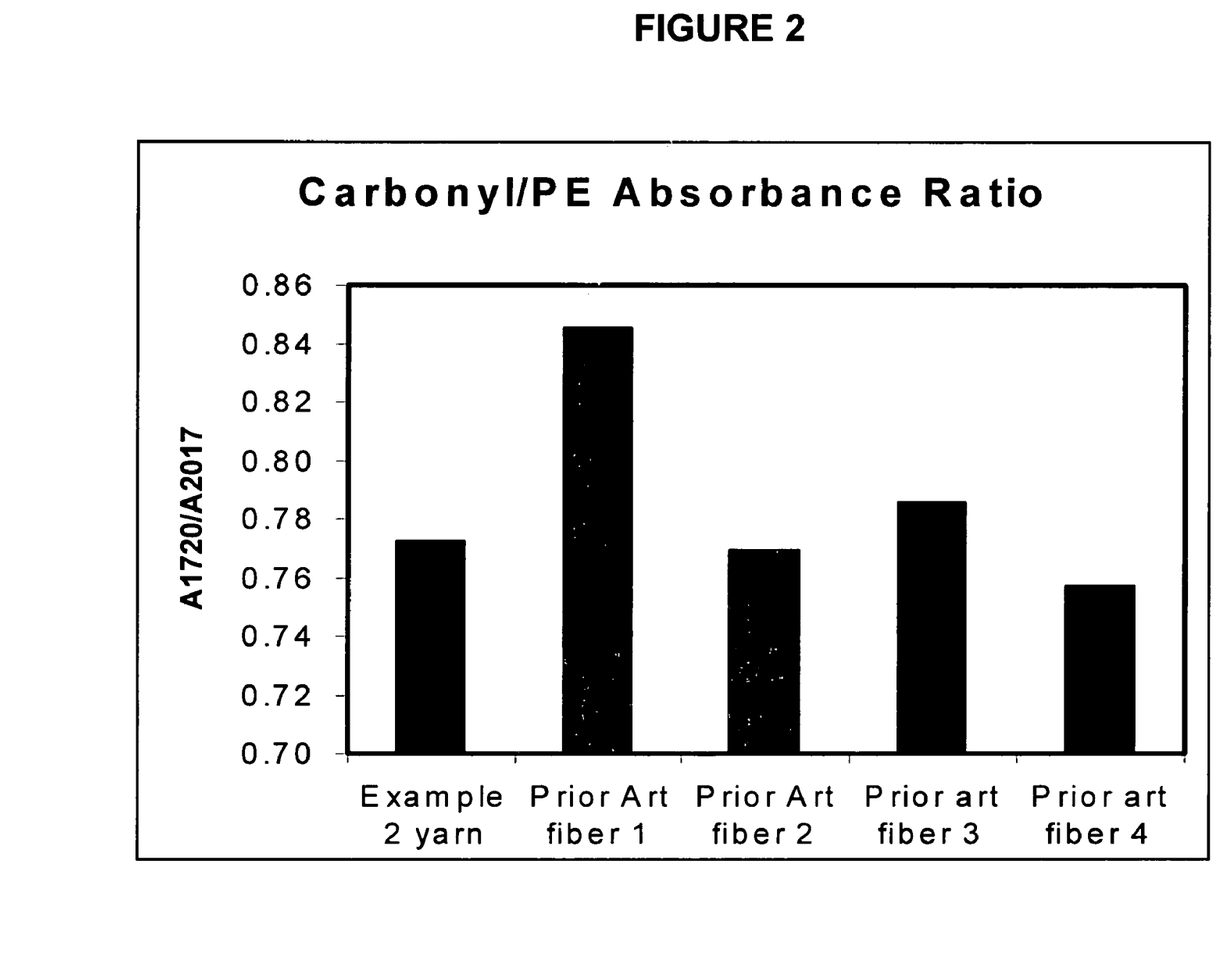
FIG. 2 shows the ratio of the infra-red absorbances at wave numbers of 1720 $cm^{-1}$ and 2017 $cm^{-1}$ corresponding to carbonyl and polyethylene —$CH_2$— stretching moieties.
Figure 3:
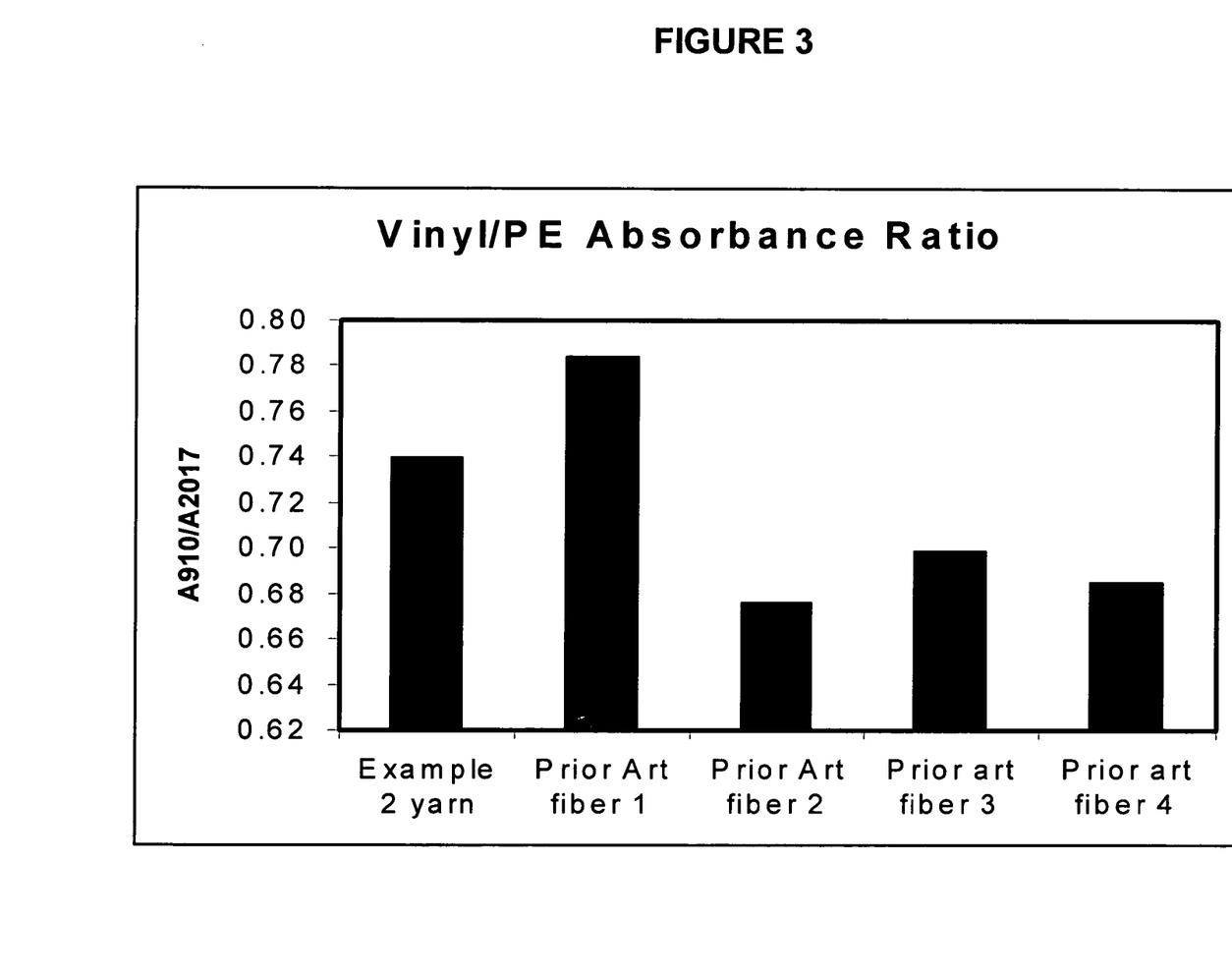
FIG. 3 shows the ratio of the infra-red absorbances at wave numbers of 910 $cm^{-1}$ and 2017 $cm^{-1}$ corresponding to vinyl and polyethylene —$CH_2$— stretching moieties.
Figure 4:
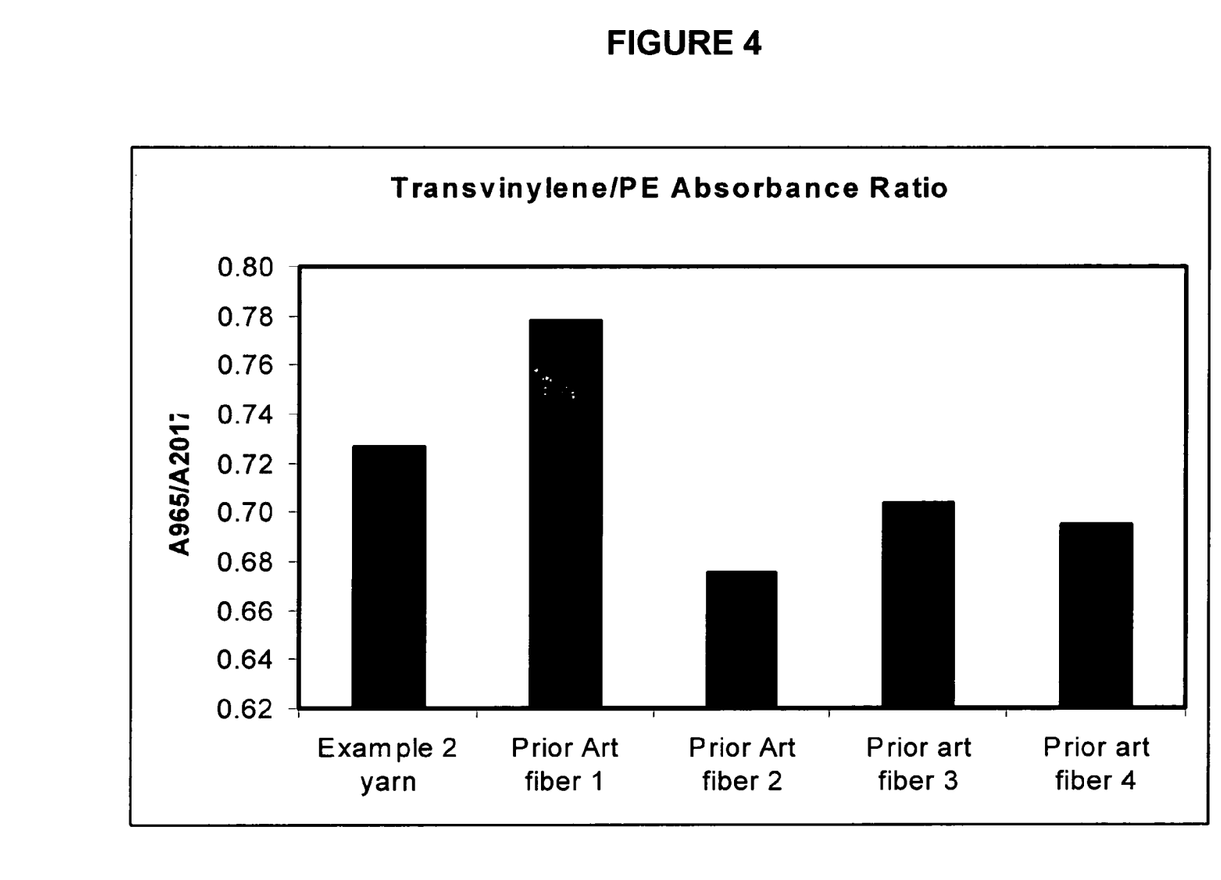
FIG. 4 shows the ratio of the infra-red absorbances at wave numbers of 965 $cm^{-1}$ and 2017 $cm^{-1}$ corresponding to trans-vinylene and polyethylene —$CH_2$— stretching moieties.
Figure 5:
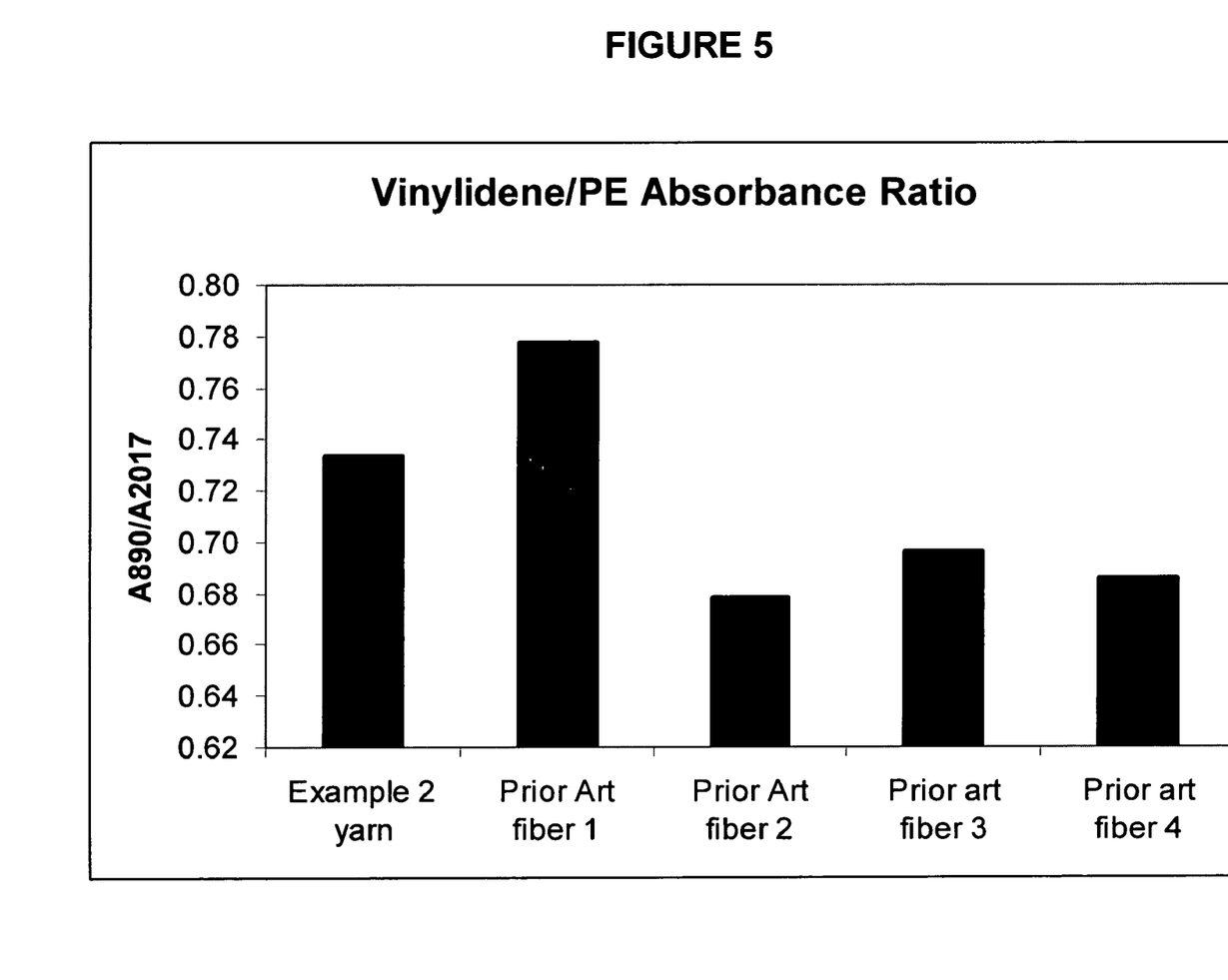
FIG. 5 shows the ratio of the infra-red absorbances at wave numbers of 890 $cm^{-1}$ and 2017 $cm^{-1}$ corresponding to vinylindene and polyethylene —$CH_2$— stretching moieties.

Infra-red absorbance ratios were measured for this yarn of the invention, and for four prior art UHMWPE fibers. The results are shown in Table I and in FIGS. 2-5. It will be seen that the yarn of the invention satisfied each of the following relationships:

$$0.842 \geq A_{1720}/A_{2017} \geq 0.77$$

$$0.77 \geq A_{910}/A_{2017} \geq 0.71$$

$$0.77 \geq A_{965}/A_{2017} \geq 0.71$$

$$0.77 \geq A_{890}/A_{2017} \geq 0.70$$

Figure 6:
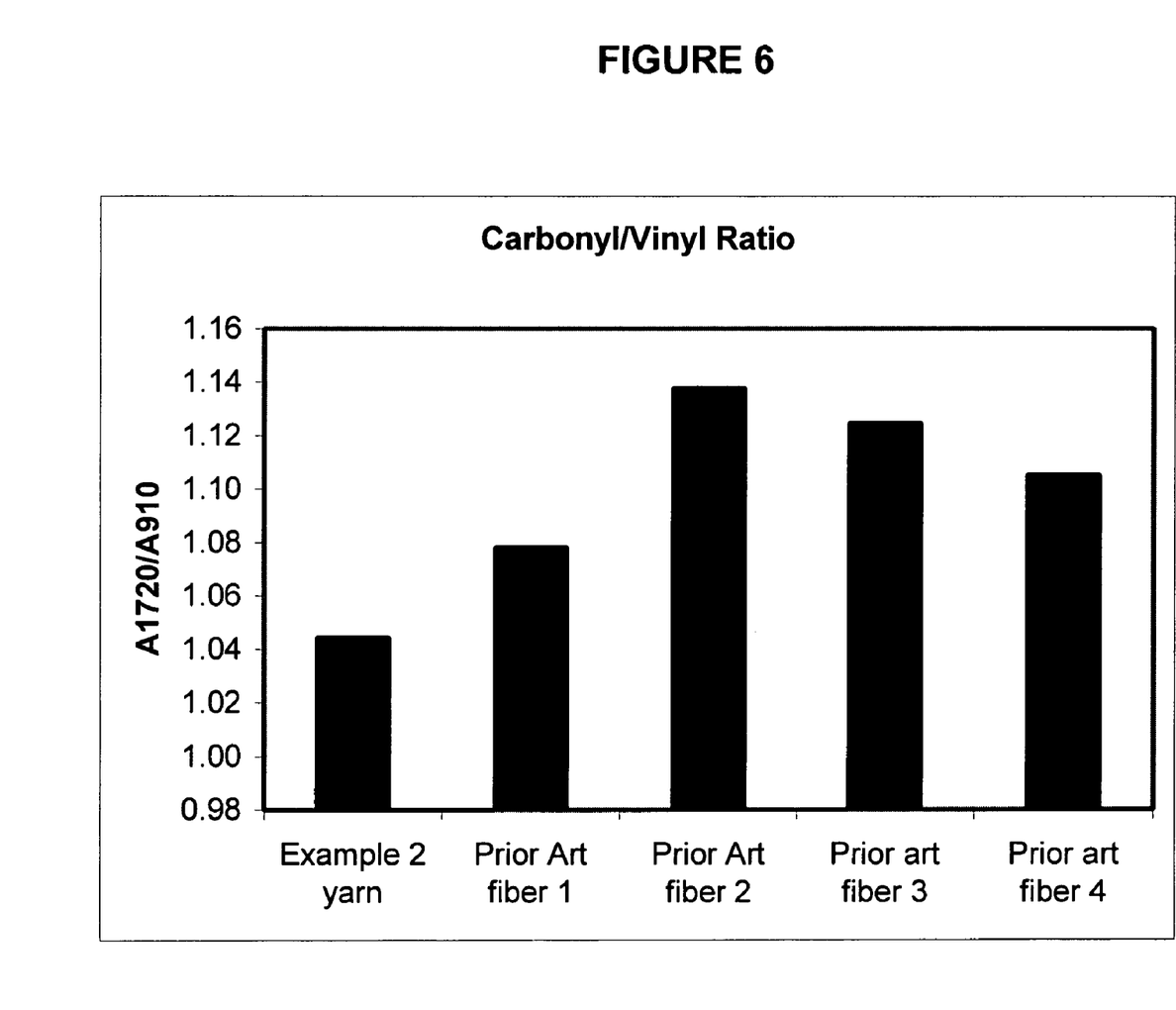
FIG. 6 shows the ratio of the ratio of the infra-red absorbances at wave numbers of 1720 $cm^{-1}$ and 910 $cm^{-1}$ corresponding to carbonyl and vinyl moieties.

It will also be seen that the ratio of the carbonyl/vinyl absorbances, $A_{1720}/A_{910}$, for the yarn of the invention was less than 1.07 and less than the corresponding ratio for the prior art materials. Without being held to a particular theory, it is believed that the process of the invention, in comparison to prior art processes, causes a greater degree of thermal-mechanical chain scission as opposed to oxidative chain scission.

TABLE I

Infra-Red Absorbance Ratios

| | Example 2 yarn | Prior Art fiber 1 | Prior Art fiber 2 | Prior art fiber 3 | Prior art fiber 4 |
|---|---|---|---|---|---|
| $A_{1720}/A_{2017}$, carbonyl/PE | 0.772 | 0.846 | 0.769 | 0.786 | 0.757 |
| $A_{910}/A_{2017}$, vinyl/PE | 0.740 | 0.784 | 0.676 | 0.699 | 0.685 |
| $A_{965}/A_{2017}$, transvinylene/PE | 0.727 | 0.778 | 0.676 | 0.704 | 0.695 |
| $A_{890}/A_{2017}$, vinylidene/PE | 0.734 | 0.777 | 0.678 | 0.696 | 0.686 |
| $A_{1720}/A_{910}$, carbonyl/vinyl | 1.04 | 1.08 | 1.14 | 1.12 | 1.11 |

Example 3

The inventive yarn described in Example 1 above was used to construct articles of the invention comprising cross-plied fiber reinforced laminates. Several rolls of the inventive yarn of Example 1 were supplied from a creel and were passed through a combing station to form a unidirectional network. The fiber network was passed over and under stationary bars to spread the yarns into thin layers. The fiber network was then carried under a roll immersed in a bath of an cyclohexane solution of a KRATON® D1107 styrene-isoprene-styrene block copolymer matrix to completely coat each filament.

The coated fiber network was passed through a squeeze roll at the exit of the bath to remove excess sealant dispersion. The coated fiber network was placed on a 0.35 mil (0.00089 cm) polyethylene film carrier web and passed through a heated oven to evaporate the cyclohexane and form a coherent fiber sheet containing 20% wt. % KRATON® matrix. The carrier web and unidirectional fiber sheet were then wound up on a roller in preparation for construction of laminates.

Two different laminates were constructed from the rolls prepared above. A two ply laminate of the invention designated type PCR was formed by placing two rolls of the sheet material described above on the cross-plying machine described in U.S. Pat. No. 5,173,138. The carrier web was stripped off and the two unidirectional fiber sheets were cross-plied 0°/90° and consolidated at a temperature of 115° C. under a pressure of 500 psi (3.5 MPa) to create a laminate.

A four ply laminate of the invention, designated type LCR, consisting of two cross-plied fiber sheets with polyethylene films on the outside surfaces, was similarly prepared. Two rolls of the sheet material described above, including the polyethylene film carrier webs, were placed on the cross-plying machine, cross-plied 0°/90°, fiber-to-fiber, with the polyethylene carrier webs on the outside and then consolidated at a temperature of 115° C. under a pressure of 500 psi (3.5 MPa) to create a laminate.

Composite targets for ballistic testing were constructed from the above laminates. Rigid targets were constructed by stacking and cross-plying several layers of the PCR laminates to the desired areal density and then re-molding at a temperature of 115° C. under a pressure of 500 psi (3.5 MPa). Flexible targets were constructed by cross-plying and loosely stacking several layers of the LCR laminates to the desired areal density.

Ballistic testing of the laminates constructed with the inventive yarn was conducted in comparison with commercially available SPECTRA SHIELD® laminates of the same PCR and LCR types prepared from SPECTRA® 1000 yarn. The ballistic testing was conducted in accord with MIL-STD 662 F.

The results are shown in Table II.

The V50 velocity is that velocity at which the probability that a projectile will penetrate is 50%.

It will be seen that the articles of the invention constructed with the inventive yarn possessed higher V50's than the targets prepared with the prior art SPECTRA® 1000 yarn over a range of projectiles

Having thus described the invention in rather full detail, it will be understood that such detail need not be strictly adhered to but that further changes and modifications may suggest themselves to one skilled in the art, all falling within the scope of the invention as defined by the subjoined claims.

TABLE II

Ballistic Test Results

| Projectile | 17 gr. Fragment Simulator | | 17 gr. Fragment Simulator | | 9 mm FMJ | | 7.62 × 51 mm M80 Ball | |
|---|---|---|---|---|---|---|---|---|
| Shield Construction | PCR | | LCR | | LCR | | PCR | |
| Fiber | S1000* | Inventive Fiber | S1000* | Inventive Fiber | S1000* | Inventive Fiber | S1000* | Inventive Fiber |
| Areal Density, psf | 1.0 | 1.0 | 0.75 | 0.75 | 0.769 | 0.769 | 3.5 | 3.5 |
| V50, ft/sec | 1815 | 1916 | 1686 | 1877 | 1475 | 1610 | 2233 | 2802 |
| V50, meters/sec | 553 | 584 | 514 | 572 | 450 | 491 | 681 | 854 |

*SPECTRA ® 1000

What is claimed is:

1. A high strength UHMWPE multi-filament yarn comprising at least about 100 filaments having a tenacity of at least about 40 g/d and an intrinsic viscosity less than or equal to about 16 dl/g and having infra-red absorbance ratios satisfying the following relationships:

$$0.84 \geq A_{1720}/A_{2017} \geq 0.77$$

$$0.77 \geq A_{901}/A_{2017} \geq 0.71$$

where $A_x$ is the infra-red absorbance at x cm$^{-1}$.

2. A high strength UHMWPE multi-filament yarn comprising at least about 100 filaments having a tenacity of at least about 40 g/d and an intrinsic viscosity less than or equal to about 16 dl/g, wherein said yarn has an infra-red absorbance ratio of $A_{1720}/A_{910}$ less than or equal to about 1.07, where $A_x$ is the infra-red absorbance at x cm$^{-1}$.

3. A high strength UHMWPE multi-filament yarn comprising at least about 100 filaments having a tenacity of at least about 45 g/d and an intrinsic viscosity less than or equal to about 16 dl/g and having infra-red absorbance ratios satisfying the following relationships:

$$0.84 \geq A_{1720}/A_{2017} \geq 0.77$$

$$0.77 \geq A_{901}/A_{2017} \geq 0.71$$

where $A_x$ is the infra-red absorbance at x cm$^{-1}$.

4. A high strength UHMWPE multi-filament yarn comprising at least about 100 filaments having a tenacity of at least about 45 g/d and an intrinsic viscosity less than or equal to about 16 dl/g, and having an infra-red absorbance ratio of $A_{1720}/A_{910}$ less than or equal to about 1.07, where $A_x$ is the infra-red absorbance at x cm$^{-1}$.

* * * * *